United States Patent
Zhong (10) Patent No.: US 10,033,835 B2
(45) Date of Patent: Jul. 24, 2018

(54) SYSTEM, METHOD, AND DEVICE FOR REMOTELY OPERATING A SERVER

(71) Applicant: Alibaba Group Holding Limited, Georgetown, Grand Cayman (KY)

(72) Inventor: Hua Zhong, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 227 days.

(21) Appl. No.: 15/176,542

(22) Filed: Jun. 8, 2016

(65) Prior Publication Data

US 2016/0366248 A1 Dec. 15, 2016

(30) Foreign Application Priority Data

Jun. 9, 2015 (CN) .......................... 2015 1 0313974

(51) Int. Cl.
*H04L 29/06* (2006.01)
*G06F 3/0484* (2013.01)
*H04L 29/08* (2006.01)
*H04L 12/24* (2006.01)
*G06F 9/46* (2006.01)

(52) U.S. Cl.
CPC .......... *H04L 67/42* (2013.01); *G06F 3/04847* (2013.01); *G06F 9/46* (2013.01); *H04L 41/00* (2013.01); *H04L 67/02* (2013.01)

(58) Field of Classification Search
USPC ........................................ 709/203, 204, 221
See application file for complete search history.

(56) References Cited

U.S. PATENT DOCUMENTS

| | | |
|---|---|---|
| 5,544,320 A | 8/1996 | Konrad |
| 5,805,897 A | 9/1998 | Glowny |
| 5,898,835 A | 4/1999 | Truong |
| 6,098,067 A | 8/2000 | Erickson |
| 6,115,736 A | 9/2000 | Devarakonda |
| 6,223,284 B1 | 4/2001 | Novoa |
| 6,256,635 B1 | 7/2001 | Arrouye |
| 6,345,294 B1 | 2/2002 | O'Toole |
| 6,594,757 B1 | 7/2003 | Martinez |
| 7,287,271 B1 | 10/2007 | Riggins |
| 7,467,211 B1 | 12/2008 | Herman |
| 7,519,962 B2 | 4/2009 | Aman |
| 7,853,645 B2 | 12/2010 | Brown |
| 7,882,173 B2 | 2/2011 | Hirsch |
| 8,745,641 B1 * | 6/2014 | Coker ................ G06F 11/3668 719/313 |
| 8,775,574 B2 | 7/2014 | DeHaan |
| 2009/0019525 A1 | 1/2009 | Yu |

(Continued)

*Primary Examiner* — Jude Jean Gilles (57) ABSTRACT

Embodiments of the present invention provide methods and systems for remotely operating a server, and solve the problem of low efficiency of remote server operations. One disclosed method includes obtaining a parameter value entered in a parameter value input box displayed on a user terminal, and a selected domain specific language (DSL) statement containing an undetermined parameter, acquiring a script command mapped by the selected DSL statement based on a preset mapping relationship between at least one saved script command and the DSL statement, generating an executable script based on the parameter value and the acquired script command, and sending the executable script to a target server for execution.

32 Claims, 5 Drawing Sheets

(56) References Cited

U.S. PATENT DOCUMENTS

| | | |
|---|---|---|
| 2009/0254337 A1 | 10/2009 | Sprecher et al. |
| 2012/0089904 A1* | 4/2012 | Datha ............... G06F 17/30056 715/236 |
| 2013/0212179 A1* | 8/2013 | Scotto Di Carlo ........................ H04M 1/72525 709/204 |
| 2014/0067836 A1 | 3/2014 | Holmes et al. |
| 2014/0189548 A1 | 7/2014 | Werner |
| 2014/0208294 A1* | 7/2014 | Randhir .............. G06F 9/45512 717/115 |
| 2015/0095923 A1* | 4/2015 | Sarid ........................ G06F 8/30 719/328 |
| 2016/0139895 A1 | 5/2016 | Stella |

* cited by examiner

| Typical DSL statement | | |
|---|---|---|
| Create user {user}, affiliated group, home directory {home} | 220 | Select |
| Modify user {user}, affiliated group {group}, home directory {home} | 225 | Select |
| Install present invention {app}, home {home} | 230 | Select |
| ... | | |

Add step

Test connectivity

Create user [ admin ] , Affiliated group [ adminGroup ] , Home directory [ /Home/admin ]
240  245  250

SYSTEM, METHOD, AND DEVICE FOR REMOTELY OPERATING A SERVER

CROSS-REFERENCE TO RELATED APPLICATION

This application claims priority to Chinese Patent Application No. 201510313974.X, filed on Jun. 9, 2015, which is incorporated herein by reference in its entirety.

TECHNICAL FIELD

Embodiments of the present invention relate to the field of network servers, and, in particular, to methods and devices for remotely operating a server.

BACKGROUND OF THE INVENTION

Remote server operation refers to technology for using at least one computer to control one or more servers remotely via a network. For example, remotely controlling a server to install products, deploy applications, and modify application configurations are examples of remote server operations. Presently, remote server operations are conducted using a script command mode.

Figure 1:
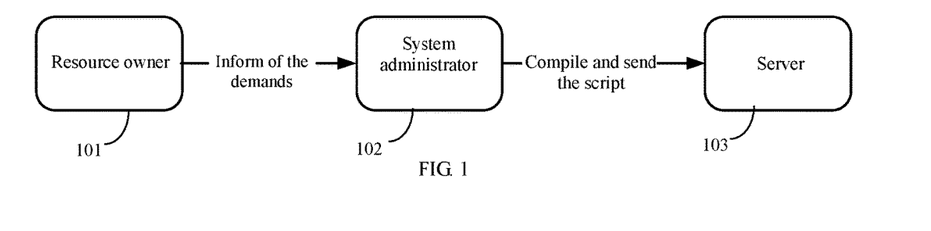
FIG. 1 is a flow chart depicting a sequence of computer implemented steps for performing a method of remote server operation using a script command mode.

An exemplary remote server operation that uses a script command mode is depicted in FIG. 1. The resource owner 101 informs the system operation/maintenance administrator 102 of an operation requirement of the server 103. The system operation/maintenance administrator 102 then writes the corresponding executable script for the operation requirement of the server 103. The administrator provides the executable script to the server 103 that the resource owner wishes to operate (the "target server") to enable remote operation of the targeted server.

Generally, a resource owner refers to a party that conducts remote operation of service, For example, a resource owner may be a product owner who needs to install products on the server, an application administrator who is responsible to install and configure applications on the server, and etc. The system operation and maintenance administrators are responsible to write corresponding executable scripts according to the server operation requirements. The executable scripts may use a specific descriptive language, and the executable script may take the form of an executable file or text commands, for example. These text commands are visible, and can be opened and edited using a text editor. In addition, these text commands collectively control computing units (e.g., a central processing unit) to perform calculation and computing operations. During execution of an executable script, the interpreter can interpret/transform each text command of the executable script into a command identifiable by the executing party (e.g., a server) so the executing party can execute the commands.

To enable remote control of a server using the script command mode, the resource owner needs to communicate with the system operation/maintenance administrators regarding the operation command, and the system operation/maintenance administrators need to write the corresponding executable script, which leads to low efficiency of remote server operations.

SUMMARY OF THE INVENTION

Embodiments of the present invention provide systems, methods, and devices for remotely operating a server in order to solve the problem of low-efficiency for remote server operations.

According to one embodiment, a method for remotely operating a target server is disclosed. The method includes displaying an interface including a parameter value input box, where the parameter value input box is generated based on an undetermined parameter of a domain specific language (DSL) statement selected by a user terminal, obtaining a parameter value entered in the parameter value input box by the user terminal, sending the parameter value to an access server, acquiring a script command at the access server, where the script command is mapped to the DSL statement based on a preset mapping relationship between the script command and the DSL statement, generating an executable script at the access server based on the parameter value and the script command, and sending the executable script to the target server for execution by the target server.

According to another embodiment, a device for remotely operating a target server is disclosed. The device includes a display device, a network interface, and a processor communicatively coupled to the display device and the network interface that obtains an interface including a parameter value input box based on DSL statement selection commands, displays the interface on the display device, where the parameter value input box is generated based on an undetermined parameter of a DSL statement, and the undetermined parameter is determined based on the DSL statement selection commands, obtains a parameter value entered in the parameter value input box, and sends the parameter value to an access server using the network interface, where the access server generates an executable script that is executed by the target server based on the parameter value and the DSL statement.

BRIEF DESCRIPTION OF THE DRAWINGS

The drawings provided are used for further description of the present invention. Illustrative embodiments and their descriptions are used to illustrate the present invention, which are not intended to limit the present invention. In the drawings.

DETAILED DESCRIPTION

The following clearly and completely describes the technical scheme of the present invention in combination with embodiments and relevant figures to make the purpose, technical scheme, and advantages of the present invention clear. The embodiments described hereinafter are not all, but part of, the embodiments of the present invention. Based on the embodiments of the present invention, other embodiments obtained by an ordinary person skilled in the art without creative work also fall into the protective scope of the present invention.

The following describes in detail embodiments of the present invention with regard to the figures. With regard to FIG. 2a, an exemplary system 100 for providing remote server access using an access server is depicted according to embodiments of the present invention. Access server 105 may include a virtual device with specialized software, or a device comprising a combination of software and hardware. The function of access server 105 and a method of using an access server will be described according to the steps below. In order to solve the low-efficiency of remote server operations, embodiments of the present invention provide a remote operation method specifically tailored to a target serve (e.g., target servers 110 and 115). Target servers 110 and 115 are accessible by user terminals 120 and 125 using access server 105. User terminals may include a desktop computer, a tablet computer, a smartphone, a wearable device with a screen, etc. Servers capable of remote operation (e.g., target servers) may include, but are not limited to, a server of a distributed computing system. According to some embodiments, the access server comprises a United Deployment Platform (UDP).

Figure 2A:
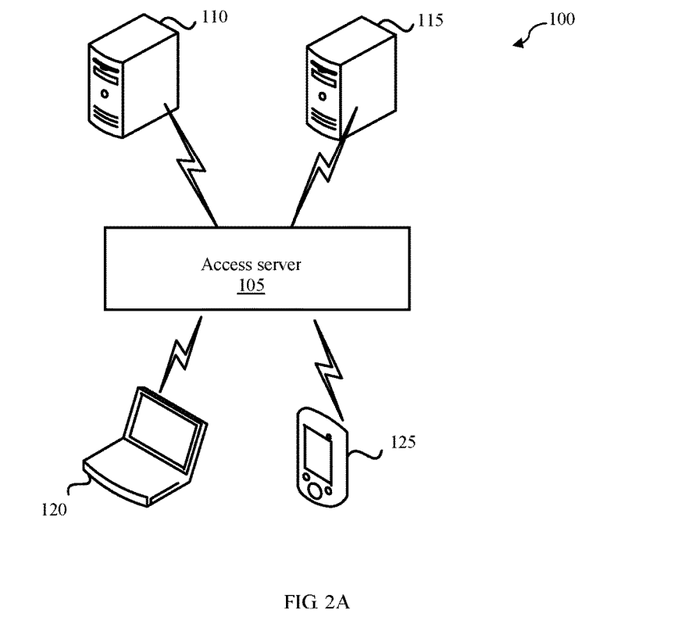
FIG. 2a is a diagram of an exemplary system for remotely operating a server according to embodiments of the present invention.

According to some embodiments, the remote operation performed on the target server by the user may include product installation, application deployment, installation configuration and modification, etc., and may further include a create operation, a delete operation, or a modification operation (e.g., an operation that modifies attributes of a file) for files on the target server. The remote operation may also include an unzip operation for files on the target server, operations of or related to the operating system of the target server (e.g., host analysis, user administration, and setting environment variables), specific commands executed on the target server. The remote operation may include saving a resource package downloaded to the target server in a designated directory, replacing an attribute value in a key/value type configuration file of the target server, modifying an attribute of selected nodes of Extensible Markup Language (XML) files in the target server, adding an attribute value to a key/value type configuration file in the target server, inserting contents in files accessible using a readline command (e.g., a data access command) in the target server, etc.

Figure 2B:
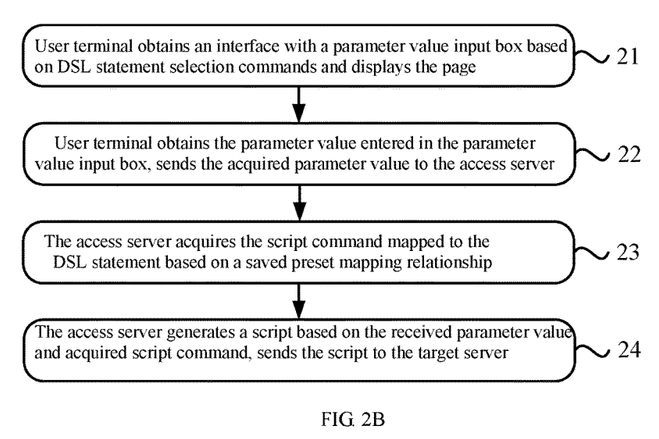
FIG. 2b is a flowchart of an exemplary sequence of computer implemented steps for performing a method for remotely operating a server according to embodiments of the present invention.

With regard to FIG. 2b, a flowchart depicting an exemplary sequence of computer implemented steps for performing a method of remote server operation is depicted according to embodiments of the present invention.

In Step 21, an interface (e.g., a window, a menu, or a webpage) containing a parameter value input box based on a domain-specific language (DSL) statement selection is displayed to a user. The parameter value input box is generated and displayed based on undefined parameters of the selected DSL statement and confirmed by a DSL statement selection command.

In Step 22, the user terminal obtains the parameter value entered in the parameter value input box, and sends the acquired parameter value to the access server. For example, FIG. 2e shows input parameter values of the parameter value input box shown in FIG. 2c, where "admin," "adminGroup," and "/home/admin" in the input box are parameter values 240-250 of interface 255.

In Step 23, the access server acquires the script command mapped by the selected DSL statement based on a preset mapping relationship between at least one saved script command and the DSL statement.

In Step 24, the access server generates an executable script based on the received parameter value and obtained script command, and sends the executable script to the target server for execution.

Figure 2C:
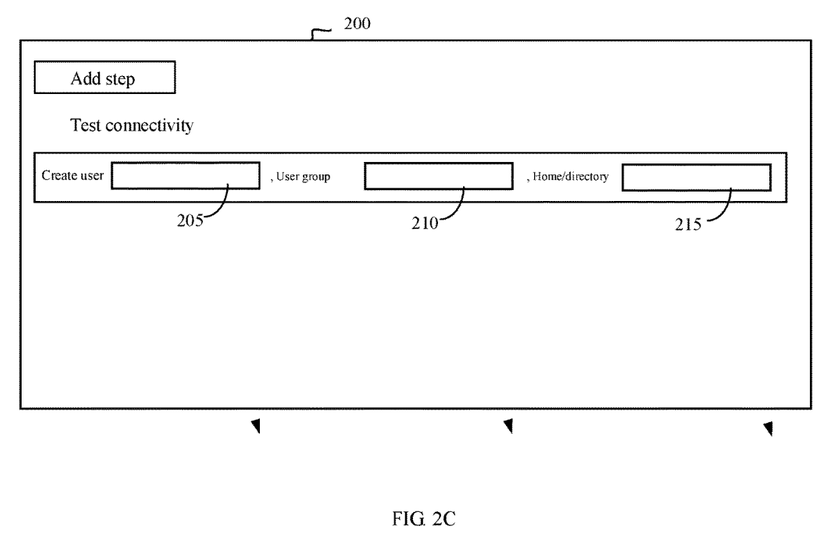
FIG. 2c is a diagram of an exemplary interface having a value input box for remotely operating a server according to embodiments of the present invention.

With regard to FIG. 2c, a parameter value input box of an exemplary interface 200 for providing remote server operation is depicted according to embodiments of the present invention. Parameter value input boxes 205-215 are positioned next to parameter descriptions: "Create user," "User group," and "Home/directory." The parameter value input boxes 205-215 may include a parameter value input box widget for acquiring content to be inserted into the associated parameter value input box. According to some embodiments, a parameter value input box may include, but is not limited to, a text input box, a drop-down box, a date selection box, a file selection box, and an attribute selection box.

According to some embodiments, the interface may include the parameter value input box or other page elements, such as parameter value descriptions, text including natural language, a tag, and instructional images. The text may include a common language such as Chinese, English, Japanese, Korean, and German. For example, "Create user," "User group," and "/Home/directory" are examples of text that use a natural language. Compared with using a programming language, using a natural language does not require users' skill in understanding a particular programming language, and thus makes it suitable for users like resource owners to understand.

The tag may include natural language or a visual guide. A visual guide, such as "〈" or "〉" may be clicked to trigger the display of additional marks or tags on the user terminal, and a visual guide may be clicked to hide the additional marks or tags, for example.

Image information containing a visual guide mentioned herein may refer to images containing the above visual guides.

Embodiments of the present invention provide methods for user terminals to acquire/display the interface for providing remote service operation. According to a first approach to acquiring/displaying the interface the access server provides Hyper Text Markup Language (HTML) code of the interface to a user terminal, and the user terminal generates and displays the interface using the HTML code. Specifically, the process of acquiring the interface includes the following substeps.

In Substep 1, the user terminal receives a DSL statement selection command. The command usually contains a feature of at least one selected DSL statements. The feature, for example, may be a unique identification of the DSL statement.

Figure 2D:
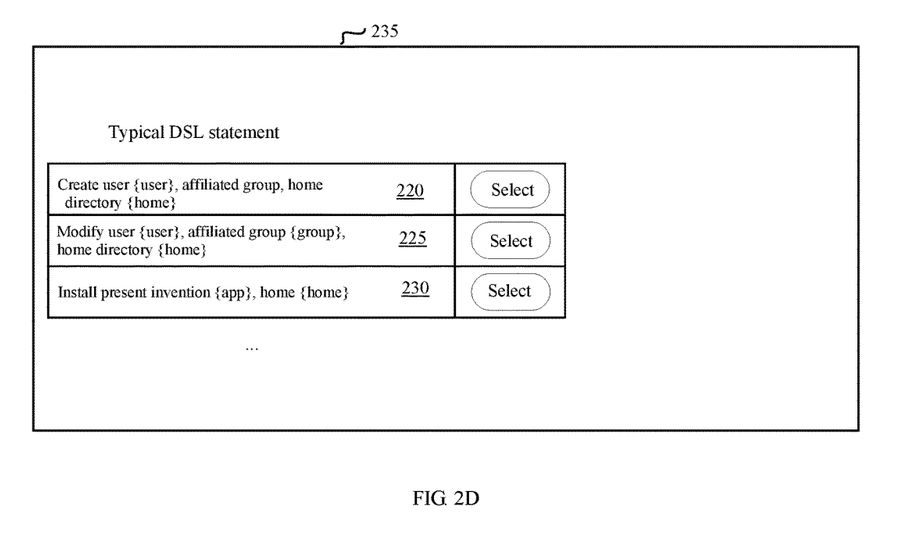
FIG. 2d is a diagram of an exemplary interface displaying selectable domain-specific language statements for remotely operating a server according to embodiments of the present invention.
Figure 2E:
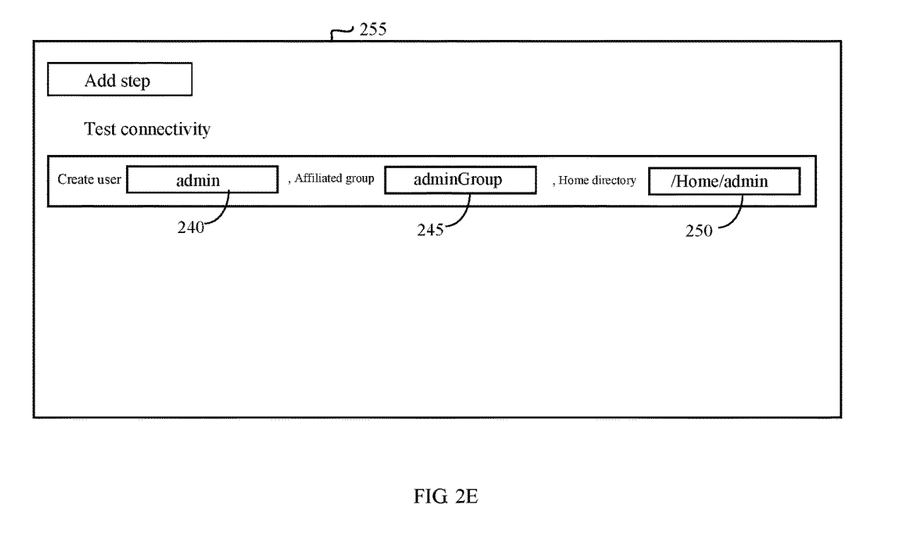
FIG. 2e is a diagram of an exemplary interface having parameter values for remotely operating a server according to embodiments of the present invention.

According to some embodiments of the present invention, DSL statement information may optional be displayed, as depicted in the example of FIG. 2d. Based on the DSL statement information 220-230 of interface 235, at least one piece of information may be selected from the DSL statement information to input DSL statement selection commands to user terminals.

In Substep 2, a DSL statement selection command is sent to the access server by the user terminal.

In Substep 3, the access server confirms the selected DSL statement based on the DSL statement selection command sent by the user terminal. For example, the access server may confirm which DSL statements are selected based on the feature of selected DSL statements included in the command.

In Substep 4, the access server generates HTML code and sends the code to the user terminal based on the confirmed DSL statement. To save storage resources of the user terminal, DSL statements may be stored outside of the local user terminal.

According to some embodiments, the method for the access server confirming the selected DSL statement and generating HTML code may include the following: The access server splits/parses the confirmed selected DSL statement to obtain an undetermined parameter and other statement contents contained in selected DSL statement. The access server generates HTML code for the parameter value input box based on the obtained undetermined parameter, and generates HTML code for the other page elements based on the other statement contents contained in the selected DSL statement.

In Substep 5, the user terminal generates and displays the interface based on the HTML code sent by the access server.

According to a second approach to acquiring/displaying the interface the process of generating and displaying the interface includes the following substeps.

In Substep a, the user terminal acquires a DSL statement based on a DSL statement selection command. The user terminal may acquire the selected DSL statement directly based on the local DSL statement and DSL statement identification (such as a certain feature) included in the commands. Alternatively, the user terminal may send the command to the access server, and the access server confirms the selected DSL statement and sends it to the user terminal.

In Substep b, the user terminal generates HTML code based on the selected DSL statement, similar to Substep 4.

In Substep c, the user terminal generates the interface based on the generated HTML code. When the user terminal generates local HTML code, the load of the access server is reduced.

According to some embodiments, a preset mapping relationship saved by or stored in the access server can be set in advance by a system administrator using the following steps. In Step A, the access server provides the "Edit Common Steps" interface 275 shown in FIG. 2f to the system administrator. In Step B, the system administrator input the script command in the script command input box following the guide information "Common Steps Script" of the interface 275. In Step C, the system administrator inputs the DSL statement in the script command input box following the guide information "Common Steps Statement" of the interface 275.

Figure 2F:
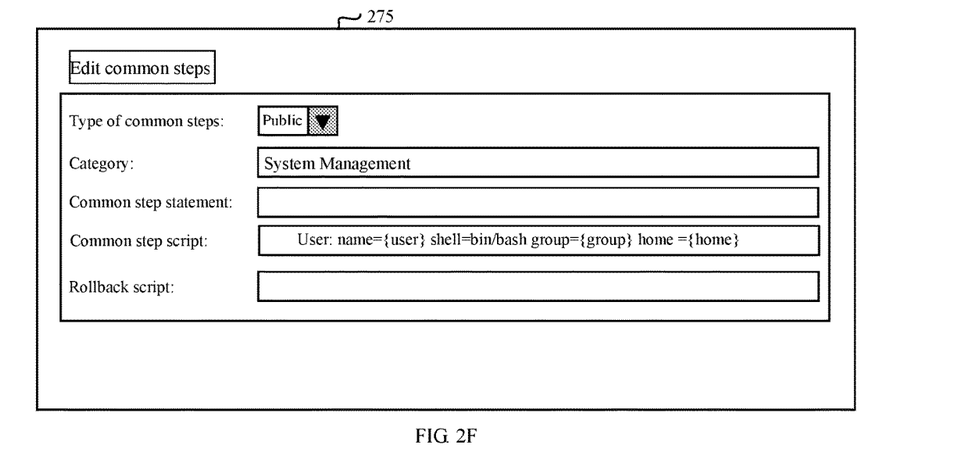
FIG. 2f is a diagram of an exemplary interface for editing a common step to remotely operate a server according to embodiments of the present invention.

When inputting script commands and DSL commands in the script command input box and the DSL statement input box, respectively, using an "Edit Common Steps" interface, the access server by default acknowledges that a mapping relationship exists between the script command and DSL statement. Generally, the access server will save the script command and DSL statement for subsequent lookups.

In summary, the mapping relationship between the script command and the corresponding DSL statement may include the following: the access server acquires at least one script command and a corresponding DSL statement, and the access server saves at least one mapping relationship between the acquired script command and corresponding DSL statement.

According to some embodiments, the mapping relationship set by the system administrator can be received from other devices. For example, the access server can receive and save a mapping relationship sent by a specific device.

With regard to obtaining a selected DSL statement at the access server, if the user terminal uses the first approach as described above to acquire/display the interface, the access server can obtain the selected DSL statement based on a DSL statement selection command sent by the user terminal. The access server can determine the selected DSL statement based on how the user terminal sent the DSL statement selection command to the access server (e.g., the user terminal generates local HTML code). If the user terminal uses the second approach as described above to acquire/display the interface, the user terminal can send the DSL statement selection command or the selected DSL statement that is determined locally at the user terminal to the access server for the access server to obtain the selected DSL statement.

According to some embodiments, the access server generates an executable script based on received parameter values and obtained script commands, and frequently combines received parameter values and acquired script commands to obtain a complete executable script that can be recognized and executed by the target server. For example, the exemplary script command shown in FIG. 2f may be the acquired script command of Step 24, where the script command is not a complete and executable step due to an undetermined parameter. For example, contents marked by { } in the script command, including "user", "group", and "home" may indicate an undetermined parameter. The access server can generate a completescript command by combing the received parameter value and the script command using the following steps:

The script command 'user name=admin shell=/bin/bash group=adminGroup home=/home/admin' can be sent by the access server as an executable script to the target server for execution to complete/enable corresponding operations for the target server.

Received parameter values can be arranged in a certain sequence. For example, parameter values "admin," "adminGroup," and "/home/admin" can be arranged by the user terminal according to a successive sequence and sent to the access server. After receiving the three parameter values arranged according to the sequence, the access server arranges the undetermined parameter in the sequence of the acquired script command with the three parameter values to complete the combination of the parameter value and the script command.

Alternatively, the received parameter value can include parameter characteristics for combining the parameter value and the script command. For example, for three parameter values "admin," "adminGroup," and "/home/admin" sent by the user terminal, if the parameter value "admin" includes a parameter characteristic, "user," and at least one undetermined parameter included in the acquired script command includes the parameter characteristic "user," parameter value "admin" can be assigned at least one undetermined parameter that includes the parameter characteristics. In order to complete the combination of the parameter value and the script command, "adminGroup" and "/home/admin" can be assigned to the corresponding undetermined parameter.

According to some embodiments, the parameter characteristics of the parameter value may be set by the user terminal. The user terminal use the characteristics of the undetermined parameter of the selected DSL statement for setting parameter characteristics. For example, the user terminal can directly set the characteristic of an undetermined parameter included in the selected DSL statement as the parameter characteristics of the corresponding parameter value, calculate characteristics of the undetermined parameter and use the result as parameter characteristics of a corresponding parameter value. When the user terminal saves the DSL statement locally, characteristics of the undetermined parameter can be acquired directly from the DSL statement; if the user terminal does not save the DSL statement locally, characteristics of the undetermined parameter included in the selected DSL statement can be acquired from the HTML code generated using an interface.

Similarly, the parameter characteristics of an undetermined parameter included in the script command can be set according to a characteristic of the undetermined parameter contained in corresponding DSL statement. The parameter characteristics may be set by the access server. When the access server receives a parameter value sent simultaneously by different users, the user terminal can set a unique identification for the parameter value when sending the parameter value to enable the access server to determine which parameter value sent by different users should be combined with the script command. For example, the unique identification can be a unique identification of the DSL statement selection command. Based on the unique identification, the access server can identify which DSL statements should correspond with a parameter value sent by the user terminal, and which script commands correspond with a parameter value. The script command corresponding to the parameter value is the script command that can be combined with the parameter value.

In some scenarios, remote operation of the target server may require using resources. For example, an installation package may be applied when configuring the target server. The installation package may be considered a resource or a resource package. A user terminal can obtain a resource package and send the obtained resource package to the access server.

According to some embodiments, the access server generating an executable script and sending the executable script to the target server for execution (step 24) may include the following steps: the access server generates an executable script and sends the generated executable script and resource package sent by the user terminal to the target server to enable the target server to determine corresponding operations of the resource package by executing the generated executable script. The target server can determine corresponding operations of the resource package and other operations by executing the generated executable script (e.g., executing a corresponding operation of the executable script).

According to some embodiments, in order to provide remote operation of the target server, a target server may be flexibly selected to conduct remote operations. The user terminal obtains identification of the selected target server and sends the identification to the access server. Based on the identification of the selected target server, the access server can send the generated executable script only to the selected target server for execution. For example, when the access server receives a resource package sent by the user terminal, the access server can send the resource package and generated executable script for the selected target server based on identification of the target server to enable the target server to use the resource package by executing the executable script. When the resource package sent by the access server corresponds to a different selected target server, the resource package sent by the user terminal to the access server can be set using an identification of the corresponding selected target server to enable the access server to distinguish between the selected target servers and corresponding resource packages, and prevent the access server from misallocating a resource package. The access server can properly distribute the resource package based on the identification of the selected target server set in the resource package. Similarly, identification of the corresponding target server can be set for an executable script corresponding to a different target server to enable the access server to properly distribute the generated executable script based on identification of the targeted target server set in the resource package.

The sequence of execution for the steps of the exemplary sequence of steps 20 is not limited to a specific order. For example, Step 22 may be executed simultaneously with or after the execution of Step 23.

Embodiments of the present invention enable an executable script to be generated and sent to a target server for execution based on a parameter value, a selected DSL statement, and/or a saved preset mapping relationship between at least one of the script commands and DSL statement. The user (e.g., a resource owner) sends a DSL statement selection command and input the parameter value using an interface containing a parameter value input box, without communicating with the system administrator regarding operation requirements, and without the system administrator writing a corresponding executable script based on the operation requirement. This significantly increases the efficiency of remote operation of the target server.

According to some embodiments, functions performed by the user terminal are not limited to applications installed on the user terminal.

Figure 3:
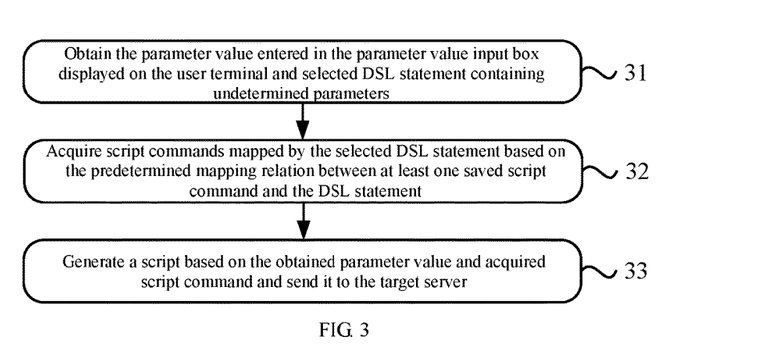
FIG. 3 is a flowchart depicting an exemplary sequence of computer implemented steps for performing a method for remotely operating a server according to embodiments of the present invention.

With regard to FIG. 3, a flowchart depicting an exemplary sequence of computer implemented steps for combining a script command and a parameter to enable remote operation of a target server is depicted according to embodiments of the present invention. The present disclosure provides a method of remotely controller a server, and it will be appreciated that the method can be performed by any suitable device or equipment which is not limited to an access server as described above. The steps depicted in FIG. 3 may be performed by an access server, for example.

In Step 31, a parameter entered in the parameter value input box displayed on the user terminal is obtained, where the selected DSL statement includes an undetermined parameter. The parameter value input box may be located in an interface displayed on the user terminal. For example, when the method depicted in FIG. 3 is performed by an access server, according to some embodiments, the HTML code of the interface can be locally generated by the access server and sent to the user terminal. Specifically, the access server can split/parse the DSL statement selected to obtain the undetermined parameter contained in the DSL statement, and other statement content. Then, based on this undetermined parameter, HTML code of the parameter value input box is generated, and the HTML code of other page elements in the interface is generated according to other statement content. The HTML code is sent to the user terminal.

According to some embodiments, the parameter value input box may include, but is not limited to, a text input box, a drop-down box, a date selection box, a file selection box, and an attribute selection box.

When the interface including the parameter value input box includes page elements other than the parameter value input box, the interface elements may include, but are not limited to, text of natural language, a tag, and a picture of visual guide.

In Step 32, the access server acquires script commands mapped by the selected DSL statement based on the predetermined mapping relationship between at least one saved script command and the DSL statement. It will be appreciated that the process of acquiring and saving the predetermined mapping relationship described above with reference to FIGS. 2a-2f can be used here.

In Step 33, according to the parameter obtained from Step 31 and script commands obtained from Step 32, an executable script is generated by combining the script commands and the parameter obtained from, and sent to, the target server for execution.

According to some embodiments, sequence of steps 30 further includes receiving a resource package (e.g., an installation package) sent by the user terminal. Based on the resource package received, generating an executable script and sending it to the target server for execution (Step 33) may include the following: generate an executable script and send the generated executable script and resource package received to the target server so that the target server can use corresponding operations of the resource package by executing the generated executable script. The target server can use corresponding operation of the resource package and other operations on the target server by executing the generated executable script (e.g., executing corresponding operations of the executable script).

For remote operation of the target server, the target server is flexibly selected to conduct remote operation. According to some embodiments, the user terminal acquires identification of the selected targeted server and sends the identification to the access server. The selected target server is the target server that will be remotely operated.

Based on the identification of the selected target server, the access server can send the generated executable script to the selected target server for execution. When the access server also receives a resource package sent by the user terminal, the access server can send the resource package and the executable script generated to the selected target server based on the identification of the target server to enable the target server to use the resource package by executing the executable script.

Each step of the method depicted in FIG. 3 may be performed by the same equipment, or different equipment. For example, Steps 31 and 32 can be performed by a first entity, while Step 33 can be performed by a second entity. As another example, Step 31 can be performed by a first entity, while Steps 32 and 33 can be performed by a second entity.

Using the exemplary method depicted in FIG. 3, an executable script can be generated and sent to a target server for execution based on a parameter value, a selected DSL statement, and a saved pre-determined mapping relationship between at least one script command and DSL statement. The user (e.g., a resource owner) sends selection commands of the DSL statement, and input parameters of parameters input boxes, without relying on a system administrator to write corresponding executable script based on the operation requirement. This significantly increases the efficiency of remote operation of the target server.

Figure 4:
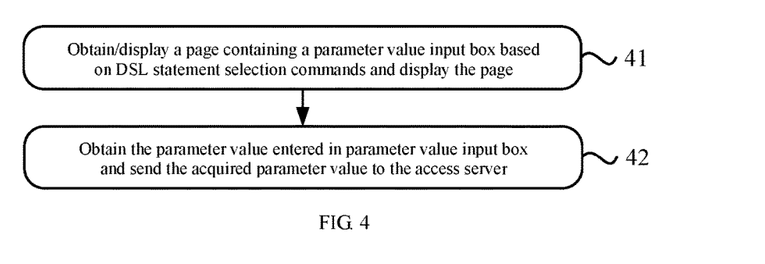
FIG. 4 is a flowchart depicting an exemplary sequence of computer implemented steps for performing a method for remotely operating a server according to embodiments of the present invention.

The embodiment described in the present disclosure with reference to FIG. 4 provides a method of remote operation on a server and the method is performed at a user terminal. However, it will be appreciated that method can be performed at any other suitable equipment.

In Step 41, an interface having a parameter value input box is obtained and displayed according to DSL statement selection commands. The generation of the parameter value input box is based on an undetermined parameter of the selected DSL statement, where the undetermined parameter is confirmed by a DSL statement selection command. In this step, at least one of the two approaches of acquiring an interface as described in the embodiment with reference to FIG. 2a-2f can be used to obtain the interface.

In Step 42, the parameter value in the parameter value input box is obtained and sent to the access server to enable the access server to generate an executable script for the target server based on the parameter value and selected DSL statement.

When remote operation of the server requires some resources, a resource package may be sent to the access server. By sending the resource package to the access server, the access server is able to send the executable script generated and the resource package to the target server, causing the target server to perform corresponding operations on/using the resource package by executing the executable script generated.

According to some embodiments, a user terminal acquires identification of the selected target server and sends the identification to the access server. The access server sends an executable script to the selected target server for execution based on the identification of the selected target server. Specifically, when the resource package is sent to the access server, the access server may send the resource package received and the executable script to the selected target server for execution based on the identification of the selected target server. The user terminal is used to obtain and display an interface containing the parameter value input box based on DSL statement selection commands, obtain parameter values in the parameter values input box, and send the obtained parameter values to the access server. The generation of a parameter value input box is based on the undetermined parameter contained in the selected DSL statement confirmed by the DSL statement selection commands. The access server is used to obtain the script commands mapped by the selected DSL statement based on the predetermined mapping relationship between at least one saved script command and DSL statement.

Figure 5:
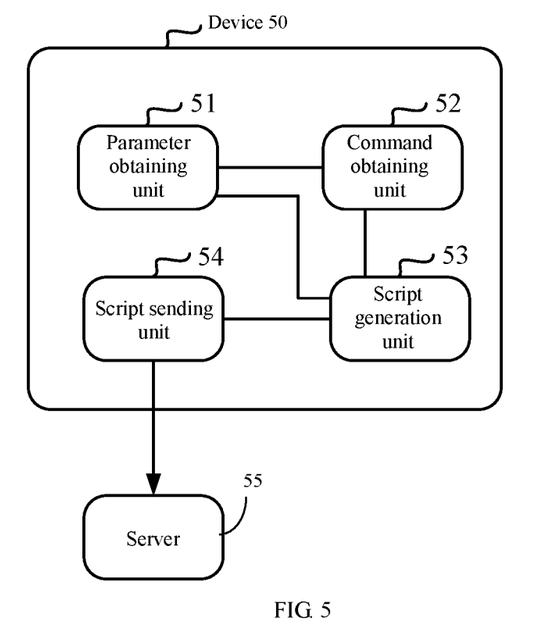
FIG. 5 is a block diagram of an exemplary device for remotely operating a server according to embodiments of the present invention.

To solve the problem of low efficiency in the existing remote server operation scheme, the embodiment as shown in FIG. 5 provides a remote operation method of the target server 55 in a system that includes at least one user terminal and at least one access server. Functions of the user terminal and the access server are described respectively as follows.

A user terminal is configured to: obtain and display an interface containing the parameter value input box based on DSL statement selection commands; obtain parameter values in the parameter values input box and send the parameter values obtained to the access server. The generation of parameter value input box is based on the undetermined parameter contained in the selected DSL statement confirmed by the DSL statement selection commands.

An access server is configured to obtain the script commands mapped by the selected DSL statement based on the predetermined mapping relation between at least one saved script commands and DSL statement. Various other functions of the user terminal and the access server and the implementation thereof may refer to the relevant description of the embodiment corresponding to FIGS. 2a-2f.

In this example, executable script can be generated and sent to the target server to execute based on the parameter value, selected DSL statement and saved predetermined mapping relation between a script command and a DSL statement. The user (such as a resource owner) needs only send DSL statement selection commands and input parameters in the page that contains parameters input box. In this manner the user needs not communicate with operation staff of the system on operation requirements or require operation staff of the system write corresponding executable script based on the operation requirement obtained through communication. This significantly and advantageously increases the efficiency of remote operation of the target server. With regard to FIG. 5, a device 50 for performing remote operation of a target server 55 is depicted according to embodiments of the present invention. Device 50 may comprise an access server, for example. Device 50 includes a parameter obtaining unit 51, a command obtaining unit 52, a script generation unit 53, and a script sending unit 54. Parameter obtaining unit 51 is used for obtaining a parameter value entered in a parameter value input box displayed on the user terminal, and a selected DSL statement including undetermined parameters. Command obtaining unit 52 is used for acquiring script commands mapped by the DSL statement obtained from parameter obtaining unit 51 based on the preset mapping relationship between at least one saved script command and DSL statement. Script generation unit 53 is used for generating the executable script based on the parameter value obtained from parameter obtaining unit 51, and the script command from command obtaining unit 52. Script sending unit 54 is used for sending the executable script generated from script generation unit 53 to a target server (e.g., server 55).

According to some embodiments, the parameter value input box is displayed on an interface. The code generation unit is used for generating the HTML code of the interface based on a DSL statement obtained from parameter obtaining unit 51, and the code sending unit is used for sending HTML code generated from the code generation unit to the user terminal.

According to some embodiments, the code generation unit splits/parses the DSL statement obtained from parameter obtaining unit 51 to obtain undermined parameters and other content of the DSL statement, generates the HTML code of the parameter value input box based on the undetermined parameters, and generates the HTML code of other page elements of the interface.

According to some embodiments, a DSL statement acquisition unit is used for acquiring at least one script and a corresponding DSL statement before command obtaining unit 52 acquires script commands mapped by the selected DSL statement based on the saved preset mapping relationship. A storage unit is used for saving the at least one script command and the corresponding DSL statement acquired by the DSL statement acquisition unit.

According to some embodiments, a resource receiving unit is used for receiving a resource package sent by the user terminal. When the device also includes the resource receiving unit, script sending unit 54 can be used for sending the executable script generated from script generation unit 53 and the resource package received by the resource receiving unit to the server so that the server can achieve the operation of the resource package based on the generated executable script.

According to some embodiments, an identification receiving unit is used for receiving the identification of the targeted server sent by the user terminal. Script sending unit 54 is used to identify the targeted server received by the identification receiving unit, and to send the executable script generated from script generation unit 53 to the targeted server, or to send the executable script generated from script generation unit 53 and the resource package received by the Resource Receiving Unit to the server.

Figure 6:
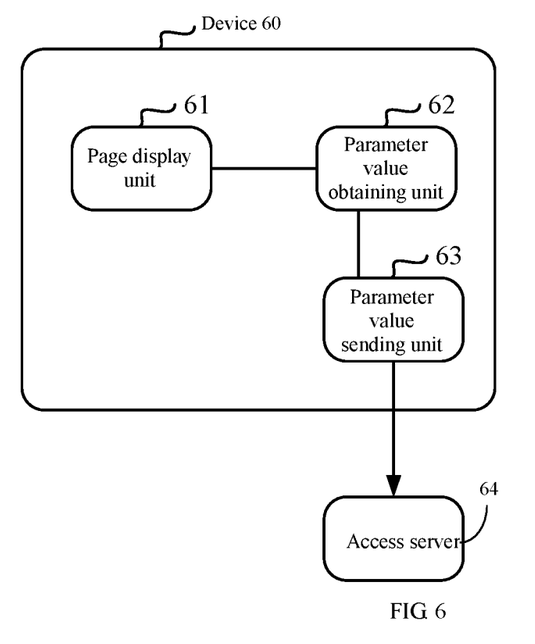
FIG. 6 is a block diagram of an exemplary device for remotely operating a server according to embodiments of the present invention.

With regard to FIG. 6, a device 60 for performing remote operation of a server is depicted according to embodiments of the present invention. Device 60 includes a page display unit 61, a parameter value obtaining unit 62, and a parameter value sending unit 63. Page display unit 61 is used for obtaining an interface including a parameter value input box based on DSL statement selection commands, and for displaying the interface. Parameter value obtaining unit 62 is used for obtaining the parameter value entered in the parameter value input box displayed on page display unit 61. Parameter value sending unit 63 is used for sending the parameter value obtained from parameter value obtaining unit 62 to an access server 64. The access server 64 generates the executable script for the target server based on the parameter value and the selected DSL statement.

According to some embodiments, page display unit 61 can operate in different modes to obtain an interface containing parameter value input box. In a first mode, page display unit 61 is used for sending the DSL statement selection command to the access server, for receiving the HTML code sent by the access server and generated based on such command, and for generating the interface containing parameter value input box based on the generated HTML code. Alternatively, in a second mode, page display unit 61 is used for directly determining the selected DSL statement using a local operation based on the DSL statement selection command, for generating the HTML code of the interface based on the determined and selected DSL statement, and for generating the corresponding page based on the HTML code. Specifically, page display unit 61 can split/parse the determined and selected DSL statement and obtain undetermined parameters and other statements/content of the selected DSL statement. Page display unit 61 generates the HTML code for other page elements on the interface based on the other statements/content, generates the corresponding page based on the HTML code generated.

According to some embodiments, a data sending unit is used for sending a resource package to the access server, for sending the identification of the targeted server to the access server, or for sending the identification of the targeted server and resource package to the access server.

A person skilled in the art will understand that embodiments of the invention provide methods, systems, or computer program products. Accordingly, the invention can include the use of an entirely hardware embodiment, an entirely software embodiment, or a combination of forms of an embodiment of software and hardware aspects. Moreover, embodiments of the invention may include computer program products implemented on one or more storage media available to the computer containing available program codes (including, but not limited to, a disk, memory, CD-ROM, and optical storage).

Embodiments of the invention are described with a reference to the flowchart and/or block diagram for the method, device (system), and computer program product. It shall be understood that each process and/or block in the flowchart and/or block diagram and combination of processes and/or blocks in the flowchart and/or block diagram can be realized via computer program commands. The computer program commands can be provided to a general-purpose computer, special computer, embedded CPU or CPUs of other programmable data processing devices to produce a machine such that the commands executed by the computer or CPUs of other programmable data processing devices are used for producing a device for implementing one or more processes in the flowchart and/or functions specified in one or more blocks in the block diagram.

The computer program commands can also be stored in a computer-readable memory to operate a computer or other programmable data processing devices in a particular manner such that the commands stored in the computer-readable memory produce manufactured products, including the command device, and the command device can implement one or more processes and/or functions specified in one or more blocks in the block diagram. These computer program commands can also be loaded onto a computer or other programmable processing devices so that a series of steps can be implemented via the computer or other programmable devices for processing achieved by the computer. Accordingly, the commands executed by the computer or other programmable processing devices can be provided to achieve one or more processes and/or functions specified in one or more blocks in the block diagram.

According to some embodiments, the computing device includes one or more CPUs, an I/O interface, a network interface, and memory. The memory may include volatile memory, random-access memory (RAM), and/or NVRAM and other forms (e.g., read-only memory (ROM) or flash RAM) with regard to a computer-readable medium. The memory is regarded as an illustrative example for a computer-readable medium.

The computer-readable media include volatile, non-volatile, movable, and non-movable media, which are used for information storage through any method or technology. The information may include a computer-readable command, data structure, program module, or other data. A storage medium of the computer may include, but is not limited to, phase-change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disc (DVD) or other optical memories, cassette magnetic tape, tape, disk memory or other magnetic memory devices, or any other non-transmission media, as well as information stored and accessible by the computing device. The computer-readable medium excludes transitory media, such as modulated data signal and carrier wave.

It should be noted that the terms "comprising," "including," or any other variation thereof are intended to cover a non-exclusive inclusion such that a series of elements including a process, method, article, or device include not only those elements, but also include other elements not expressly listed or for inherent elements for such a process, method, article or device. In the absence of more restrictions, the elements defined by the sentence "comprise a . . . " do not exclude the presence of other identical elements for the process, method, article, or device comprising the elements.

Only embodiments of the present invention are described above; however, it is not intended to limit the scope of the present invention. For a person skilled in the art, the invention may take on various alterations and changes. Any alteration, equivalent replacement and improvement, etc., without departing from its spirit and principle of the present invention, shall fall into the scope of the claims of the present invention.

What is claimed is:

1. A method for remotely operating a target server, comprising:
   displaying an interface including a parameter value input box, wherein the parameter value input box is generated based on an undetermined parameter of a domain specific language (DSL) statement selected by a user terminal;
   obtaining a parameter value entered in the parameter value input box by the user terminal;
   sending the parameter value to an access server;
   acquiring a script command at the access server, wherein the script command is mapped to the DSL statement based on a preset mapping relationship between the script command and the DSL statement;
   generating an executable script at the access server based on the parameter value and the script command; and
   sending the executable script to the target server for execution by the target server.

2. The method of claim 1, wherein the displaying an interface comprises:
   receiving a command at the access server from the user terminal;
   selecting the DSL statement based on the command;
   generating HTML code of the interface based on the DSL statement selected; and
   sending the HTML code to the user terminal.

3. The method of claim 2, further comprising:
   parsing the DSL statement selected to obtain the undetermined parameter and a content of the DSL statement selected;
   generating the HTML code of the parameter value input box based on the undetermined parameter; and
   generating HTML code of a page element of the interface based on the content.

4. The method of claim 2, further comprising
   selecting the DSL statement based on the command;
   generating HTML code of the interface based on the DSL statement selected; and
   generating the interface based on the HTML code.

5. The method of claim 4, further comprising:
   obtaining the undetermined parameter and the content from the DSL statement by splitting the selected DSL statement;
   generating HTML code of the parameter value input box according to the undetermined parameter; and
   generating HTML code of a page element of the interface based on the content.

6. The method of claim 1, further comprising:
   obtaining a first script command and a corresponding DSL statement, at the access server; and saving a first mapping relationship between the first script command and the corresponding DSL statement.

7. The method of claim 1, further comprising:
receiving a resource package at the access server; and
sending the resource package and the generated executable script to the target server to perform a corresponding operation using the resource package by executing the generated executable script.

8. The method of claim 7, further comprising:
receiving an identification of the target server at the access server; and
sending the resource package and generated executable script from the access server to the target server based on the identification of the target server.

9. The method of claim 1, further comprising:
receiving the identification of the selected targeted target server at the access server; and
sending the generated executable script to the target server for execution based on the identification of the targeted target server.

10. The method of claim 9, wherein the parameter value input box comprises at least one of a text entry box, a drop-down box, a date selection box, a file selection box, and an attribute selection box.

11. The method of claim 10, wherein the interface comprises at least one of a text of natural language, a tag, and a picture of a visual guide.

12. A method for remotely operating a target server, the method comprising:
obtaining a page comprising a parameter value input box, wherein the page is based on a domain specific language (DSL) statement, the parameter value input box is generated based on an undetermined parameter of the DSL statement, and the DSL statement is determined based on a DSL selection command;
obtaining a parameter value from the parameter value input box; and
sending the parameter value to an access server to generate an executable script that is executable by the target server, wherein the executable script is based on the parameter value and the selected DSL statement.

13. The method of claim 12, wherein the obtaining a page comprising a parameter value input box comprises:
sending the DSL selection command to the access server;
receiving HTML code for generating the page comprising the parameter value input box; and
generating the page based on the HTML code.

14. The method of claim 13, wherein the generating the page based on the HTML code comprises:
determining the selected DSL statement based on the DSL selection command;
generating the HTML code of the page based on the selected DSL statement; and
displaying the page based on the HTML code.

15. The method of claim 14, wherein the generating HTML code of the page based on the selected DSL statement comprises:
parsing the selected DSL statement to obtain the undetermined parameter and a statement content of the selected DSL statement;
generating HTML code of the parameter value input box based on the undetermined parameter; and
generating HTML code for a page elements of the page based on the statement content.

16. A device for remotely operating a target server, comprising:
a display device;
a network interface; and
a processor communicatively coupled to the display device and the network interface that obtains an interface comprising a parameter value input box based on DSL statement selection commands, displays the interface on the display device, wherein the parameter value input box is generated based on an undetermined parameter of a DSL statement, and the undetermined parameter is determined based on the DSL statement selection commands, obtains a parameter value entered in the parameter value input box, and sends the parameter value to an access server using the network interface, wherein the access server generates an executable script that is executed by the target server based on the parameter value and the DSL statement.

17. The device of claim 16, wherein the processor sends the DSL statement selection commands to the access server, receives HTML code of the interface generated by the access server based on the commands, and generates the interface based on the HTML code.

18. The device of claim 17, wherein the parameter value input box comprises at least one of a text entry box, a drop-down box, a date selection box, a file selection box, and an attribute selection box.

19. The device of claim 18, wherein the interface comprises at least one of a text of natural language, a tag, and a picture of a visual guide.

20. The device of claim 19, wherein the processor acquires a script command input into the access server, and a corresponding DSL statement, and saves a first mapping relationship between the script command input into the access server and the corresponding DSL statement.

21. A method for remotely operating n access server, the method comprising:
obtaining a parameter value in a parameter value input box that is displayed on a user terminal;
obtaining a selected DSL (Domain Specific Language) statement containing an undetermined parameter;
acquiring a script command mapped based on the selected DSL statement and based on a preset mapping relation between at least one saved script command and the DSL statement;
generating an executable script based on the parameter value and an acquired script command; and
and sending the executable script to a target server for execution.

22. The method of claim 21, wherein the parameter value input box is encompassed in page of a graphical user interface, and the method further comprises:
generating HTML (Hypertext Markup Language) code of the page based on the selected DSL statement, and sends the HTML code to the user terminal.

23. The method of claim 22, wherein the generating HTML code of the page is based on the selected DSL statement, and wherein the generating comprises:
obtaining the undetermined parameter and other statement contents that are contained in the selected DSL statement by splitting the parsing the DSL statement;
generating HTML code of the parameter value input box according to the undetermined parameter, and generating HTML code of other page elements on the page based on the other statement contents.

24. The method of claim 21 further comprises, before acquiring the script command mapped by the selected DSL statement based on the preset mapping relation:
obtaining at least one input script command and a corresponding DSL statement; and
saving the mapping relation between the acquired at least one script command and corresponding DSL statement.

25. The method of claim 21 further comprising:
receiving a resource package sent by the user terminal; and
generating an executable script; and
sending the executable script to the target server for execution, wherein the sending comprises: generating an executable script; and sending the resource package and generated executable script to the target server, wherein the target server is configured to perform corresponding operations based on the resource package by executing the generated executable script.

26. The method of claim 25 further comprising:
receiving the identification of targeted target server sent by the user terminal; and
sending the resource package and generated executable script to the target server, wherein the sending comprises:
sending the resource package and generated executable script to the target server based on an identification of the target server.

27. The method of claim 21 further comprising:
receiving an identification of target server sent by the user terminal; and
based on the identification of the target server, generating an executable script and sending the executable script to the target server for execution.

28. A system for remotely operating the server, the system comprising:
a user terminal configured to:
obtain a page of a graphical user interface, the page containing parameter value input box based on DSL (Domain Specific Language) statement selection commands;
display the page; and
obtain a parameter value entered in the parameter value input box;
send the parameter value to a access server, wherein the parameter value input box is generated based on an undetermined parameter in DSL statement which is determined and selected based on the DSL statement selection commands;
the access server configured to:
acquire a script command mapped by the selected DSL statement based on a preset mapping relation between at least one saved script command and the DSL statement; and
generating an executable script based on a received parameter value and an acquired script command and sending the executable script to a target server for execution.

29. The system of claim 28, wherein
the user terminal is further configured to send the DSL statement selection commands to the access server, generate the page based on the HTML code of the page sent by the access server, and display the page; and
the access server is further configured to: determine the DSL statement to be selected based on the DSL statement selection commands; and generate HTML code of the page based on the selected DSL statement, and sending this HTML code to the user terminal.

30. The system of claim 28, wherein the access server is further configured to:
acquire at least one the script command input into the access server and a corresponding DSL statement; and
save the preset mapping relation between the acquired at least one script command and corresponding DSL statement.

31. The system of claim 28, wherein the parameter value input box comprises at least one of text entry box, drop-down box, date selection box, file selection box and attribute selection box.

32. The system according to claim 31, wherein if the page contains other page elements other than the parameter input box, the other page elements comprise at least one of text message of natural language, tag and picture message containing guiding sign.

* * * * *